United States Patent
Bertin

(10) Patent No.: US 11,994,411 B2
(45) Date of Patent: May 28, 2024

(54) VERNIER SENSOR WITH SELF CALIBRATION

(71) Applicant: SEMICONDUCTOR COMPONENTS INDUSTRIES, LLC, Phoenix, AZ (US)

(72) Inventor: Jacques Jean Bertin, Pocatello, ID (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 87 days.

(21) Appl. No.: 17/652,535

(22) Filed: Feb. 25, 2022

(65) Prior Publication Data

US 2023/0273051 A1 Aug. 31, 2023

(51) Int. Cl.
  *G01D 18/00* (2006.01)
  *G01D 5/22* (2006.01)
  *G01D 5/245* (2006.01)

(52) U.S. Cl.
  CPC .......... *G01D 18/001* (2021.05); *G01D 5/22* (2013.01); *G01D 5/2452* (2013.01); *G01D 5/2455* (2013.01); *G01D 5/2458* (2013.01)

(58) Field of Classification Search
  CPC ...... G01D 5/22; G01D 5/2449; G01D 5/2452; G01D 5/2455; G01D 5/2458; G01D 18/001; G01D 18/002; G01D 18/004; G01D 18/006; G01D 18/008
  See application file for complete search history.

(56) References Cited

U.S. PATENT DOCUMENTS

| | | | |
|---|---|---|---|
| 6,242,906 B1* | 6/2001 | Andermo | G01D 5/2053 324/207.17 |
| 6,466,889 B1* | 10/2002 | Schodlbauer | G01B 7/02 702/150 |
| 8,952,683 B2* | 2/2015 | Granig | G01D 5/145 324/252 |
| 2004/0004471 A1* | 1/2004 | Haas | G01D 5/24476 324/207.2 |
| 2014/0340560 A1* | 11/2014 | Miyashita | G01B 7/30 348/335 |
| 2016/0011015 A1* | 1/2016 | Angelis | G01D 5/2454 324/207.25 |
| 2018/0202835 A1* | 7/2018 | Möller | G01B 7/003 |
| 2019/0265069 A1* | 8/2019 | Roberts | G01D 5/145 |
| 2020/0003585 A1* | 1/2020 | Narita | G01D 5/24476 |
| 2020/0003586 A1* | 1/2020 | Narita | G01D 5/24419 |
| 2020/0041308 A1* | 2/2020 | Kuwahara | G01D 5/14 |

(Continued)

FOREIGN PATENT DOCUMENTS

EP 2881715 A1 6/2015

*Primary Examiner* — Steven L Yeninas
(74) *Attorney, Agent, or Firm* — Brake Hughes Bellermann LLP

(57) ABSTRACT

A vernier sensor including a coarse sensor and a fine sensor may require calibration to ensure accurate position measurements. Calibration may include determining coefficients for harmonics that can be added to the coarse sensor output and the fine sensor output to reduce harmonic distortion. The disclosure describes using the offset and variance of a difference signal as the basis for calibration. This approach is possible at least because the frequencies of the coarse sensor and fine sensor can be selected to reduce the complexity of these calculations.

23 Claims, 11 Drawing Sheets

(56) References Cited

U.S. PATENT DOCUMENTS

| | | | |
|---|---|---|---|
| 2021/0025736 A1* | 1/2021 | Khripin | G01D 5/2452 |
| 2021/0223126 A1* | 7/2021 | Toyama | G01L 3/104 |
| 2021/0285752 A1* | 9/2021 | Mottram | G01D 5/2452 |
| 2022/0290965 A1* | 9/2022 | Ichinomiya | G01R 33/091 |
| 2022/0412782 A1* | 12/2022 | Konno | G01D 5/56 |
| 2023/0160722 A1* | 5/2023 | Brajon | G01D 5/24438 |
| | | | 324/202 |

* cited by examiner

VERNIER SENSOR WITH SELF CALIBRATION

FIELD OF THE DISCLOSURE

The present disclosure relates to position sensors and more specifically to a vernier position sensor including self-calibration to increase accuracy.

BACKGROUND

A vernier sensors may be used to obtain linear or angular measurements of a movable element. These measurements may include a calibration to improve accuracy.

SUMMARY

In some aspects, the techniques described herein relate to a method for calibrating a position sensor, the method including: moving a movable element of the position sensor over a measurement range to acquire: a first output signal from a first sensor, the first output signal having increments repeating at a first frequency, and a second output signal from a second sensor, the second output signal having increments repeating at a second frequency; computing a difference signal based on the first output signal and the second output signal; calculating an offset of the difference signal and a variability of the difference signal; determining a first calibration and a second calibration to reduce the offset and the variability; and applying the first calibration to the first output signal and the second calibration to the second output signal.

In some aspects, the techniques described herein relate to a method, further including: repeating the computing, the calculating, the determining, and the applying for a number of iterations to determine the offset and the variability of the difference signal for each iteration; comparing the offset and the variability of repetitions of the iterations to select an iteration that generated a minimum offset and a minimum variability; and storing, in a memory, the first calibration and the second calibration of the selected iteration.

In some aspects, the techniques described herein relate to a method, wherein the first calibration includes a plurality of first calibration coefficients and the second calibration includes a plurality of second calibration coefficients.

In some aspects, the techniques described herein relate to a method, wherein the measurement range is a portion of a total measurement range of the position sensor.

In some aspects, the techniques described herein relate to a method, wherein the portion is less than less than 90% of the total measurement range.

In some aspects, the techniques described herein relate to a method, wherein the portion does not include a maximum of the total measurement range or a minimum of the total measurement range.

In some aspects, the techniques described herein relate to a method, wherein the first output signal and the second output signal include measurements taken at positions in the measurement range that are not equally spaced.

In some aspects, the techniques described herein relate to a method, wherein the position sensor is an angular position sensor.

In some aspects, the techniques described herein relate to a method, wherein the first sensor and the second sensor are inductive sensors.

In some aspects, the techniques described herein relate to a method, wherein the variability is a variance of the difference signal.

In some aspects, the techniques described herein relate to a method, wherein calculating the variance of the difference signal includes approximating an expected value of the variance of the difference signal based on (i) a frequency of the second sensor being larger than the first sensor and (ii) a frequency of the second sensor being coprime with the frequency of first sensor.

In some aspects, the techniques described herein relate to a method, wherein the frequency of the second sensor is greater than or equal to 10 times the frequency of the first sensor.

In some aspects, the techniques described herein relate to a method, wherein the approximating includes eliminating harmonic components in the expected value of the variance of the difference signal that are common to the first sensor and the second sensor.

In some aspects, the techniques described herein relate to a method wherein computing a difference signal based on the first output signal and the second output signal includes: appending the increments of the first output signal to generate a first absolute signal; appending the increments of the second output signal to generate a second absolute signal; scaling the first absolute signal relative to the second absolute signal to generate a first scaled absolute signal; scaling the second absolute signal relative to the first absolute signal to generate a second scaled absolute signal; and subtracting, point by point, the first scaled absolute signal from the second scaled absolute signal to compute the difference signal.

In some aspects, the techniques described herein relate to a position measurement system including: a position sensor including: a first sensor configured to output a first output signal; a first sensor correction circuit configured to apply a first calibration to the first output signal to generate a first corrected signal; a second sensor configured to output a second output signal; and a second sensor correction circuit configured to apply a second calibration to the second output signal to generate a second corrected signal; and a processor coupled to the position sensor and configured by software instructions to: generate a difference signal based on the first corrected signal and the second corrected signal; calculate an offset of the difference signal; calculate a variability of the difference signal; and determine a calibration quality based on the offset and the variability.

In some aspects, the techniques described herein relate to a position measurement system, wherein the processor is further configured by software instructions to: calculate an angle based on the first corrected signal and the second corrected signal.

In some aspects, the techniques described herein relate to a position measurement system, wherein to calculate the angle the processor is further configured by software instructions to: map the first corrected signal and the second corrected signal to a closest point on an ideal map of outputs, wherein each point on the ideal map of output corresponds to an angle.

In some aspects, the techniques described herein relate to a position measurement system, wherein the processor is further configured by software instructions to: generate a message when the calibration quality drops below a threshold.

In some aspects, the techniques described herein relate to a position measurement system, wherein the processor is further configured by software instructions to: recalibrate the position sensor by: iteratively computing the offset and the variability of the difference signal for different calibrations coefficients to find a new first calibration for the first output signal and a new second calibration for the second output signal.

In some aspects, the techniques described herein relate to a position measurement system, wherein: the position sensor is an inductive angular sensor having a first number of repeating increments in a 360-degree measurement range; and the position sensor is an inductive angular sensor having a second number of repeating increments in the 360-degree measurement range, wherein the first number and the second number are coprime.

In some aspects, the techniques described herein relate to a method for determining calibration coefficients for a vernier position sensor, the method including: transforming a first incremental signal from a first sensor of the vernier position sensor to a first absolute signal; transforming a second incremental signal from a second sensor of the vernier position sensor to a second absolute signal; computing a difference signal of based on the first absolute signal and the second absolute signal; calculating an offset and a variability of the difference signal; and performing an optimization routine that includes adjusting calibration coefficients applied to the first incremental signal and the second incremental signal to reduce the offset and the variability of the difference signal.

In some aspects, the techniques described herein relate to a method for determining calibration coefficients for a vernier position sensor, wherein the optimization routine includes: gathering a calibration measurement using the vernier position sensor to obtain a first incremental signal for calibration and a second incremental signal for calibration; and iteratively: selecting calibration coefficients, applying the selected calibration coefficients to the first incremental signal and the second incremental signal, and calculating the offset and the variability of the difference signal for each iteration to determine calibration coefficients that result in a minimum offset and variability for the iterations.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

A position sensor may include a sensor that has an output that varies from minimum to maximum repeatedly as it is moved through a measurement range. This repeating pattern makes determining an absolute position within the measurement range impossible. Vernier sensors resolve this ambiguity through the use of two sensors. A first sensor and a second sensor each have an output that varies from minimum to maximum repeatedly as it is moved through the measurement range, however the first sensor repeats with a first frequency and the second sensor repeats with a second (different) frequency. In this situation it is possible to resolve the absolute position of the measurement because the output of the first sensor and the second sensor form unique pairs for all possible positions in the measurement range. Thus, absolute positions may be mapped to pairs of outputs from the first sensor and the second sensor. Harmonic distortion can affect the outputs of the first sensor and the second sensor so that mapping is difficult, which can create errors in the measurements obtained using the vernier sensor.

The present disclosure describes a vernier sensor and a method for calibration that can decrease an offset and a variability in the sensor outputs caused by harmonic distortion. The disclosed techniques are computationally efficient based (at least) on the fact that the first sensor and the second sensor are built with different geometrical frequencies, which are selected to make the calibration of the two sensors independent. Further, the disclosed techniques can ease the requirements for calibration. As a result, the calibration may be applied at either an end-of-line production step or in the field without requiring an accurate angular reference. What is more, the disclosed techniques can be implemented during operation of the vernier sensor as a diagnostic to monitor the sensor outputs and determine if the sensor outputs are drifting or out of calibration.

Figure 1:
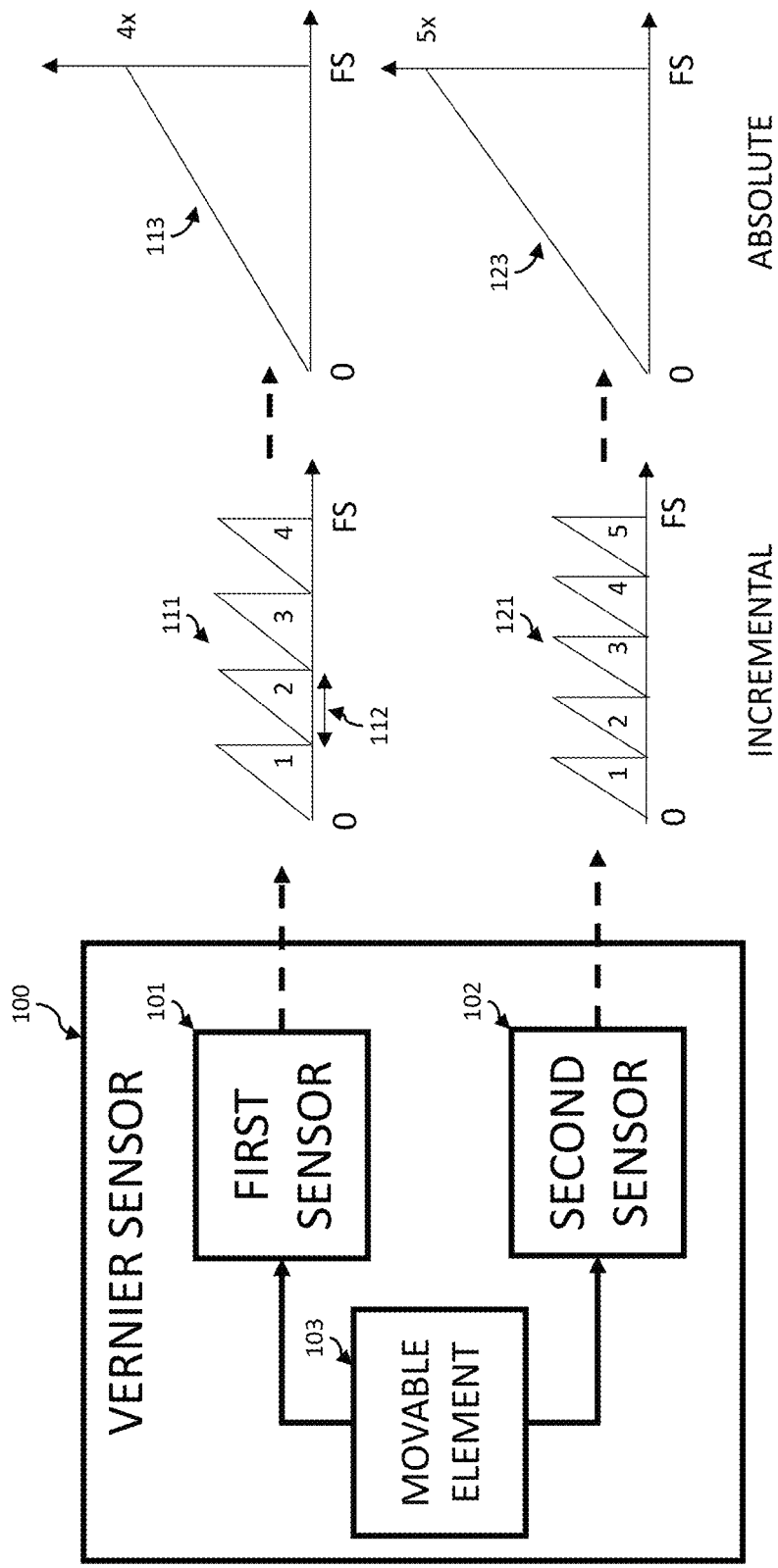
FIG. 1 illustrates a vernier sensor according to a possible implementation of the present disclosure.

A vernier position sensor (i.e., vernier sensor), as described herein, may utilize a first sensor and a second sensor to determine a position in a range from zero to full scale. The position sensor may measure linear or angular positions. FIG. 1 illustrates a vernier sensor according to a possible implementation of the present disclosure. The vernier sensor 100 includes a movable element 103 (e.g., level, rotor, shaft, etc.), a first sensor 101, and a second sensor 102. As the movable element 103 is moved in a measurement range from a starting position (i.e., zero) to a full scale (FS) position, the output of the first sensor 101 and the second sensor 102 may each repeat in increments according to a (geometric) frequency. The first sensor 101 may have a first output (i.e., first output signal 111) that repeats at a first frequency and the second sensor 102 may have a second output (i.e., second output signal 121) that repeats at a second frequency. The frequency (i.e., number of increments in a full rotation) of each sensor may be different so that as the movable element changes position from zero to full-scale, the measurement can be determined unambiguously (e.g., the outputs form different pairs). An increment may be a portion of an output signal, which is repeated multiple times as a movable element of the vernier sensor is moved through a measurement range (e.g., 0 to full-scale). In other words, an increment of the first sensor may correspond to one period of the first output signal, while an increment of the second sensor may correspond to one period of the second output signal. An incremental measurement can include one or more increments.

In a possible implementation the first sensor and the second sensor are inductive sensors configured to measure an angle of a movable element (e.g., rotor). In this case, the measurement range may be $0 \leq \theta \leq 360$ degrees and the position measured by the vernier sensor 100 may be an angle in this range. Inductive position sensors (e.g., inductive angular sensors) can be used in numerous fields in a variety of different applications. For example, the inductive position sensors can be used to detect the position of a robotic arm for control of its movement in an industrial application (e.g., assembly).

Figure 2:
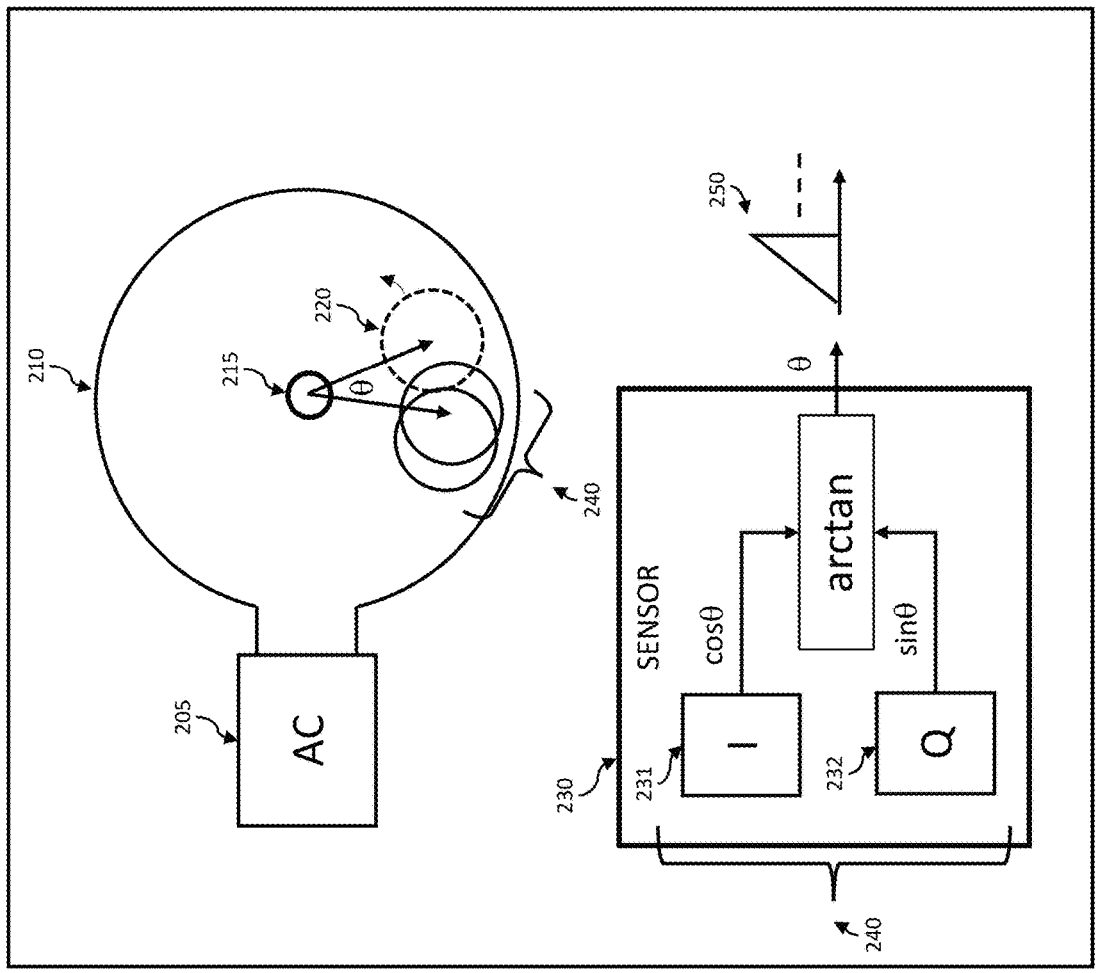
FIG. 2 illustrates the operating principles of an inductive angular sensor according to an implementation of the present disclosure.

FIG. 2 illustrates the operating principles of an inductive sensor according to an implementation of the present disclosure. The inductive sensor includes an AC source 205 coupled to an transmit element 210. As shown the transmit element 210 may be a coil that induces a magnetic field according to the AC signal generated by the AC source 205. The magnetic field may be coupled inductively to a coupling element 220. The coupling element 220 may be a coil that is mechanically coupled to a moveable element (i.e., rotor 215) so that it can be moved (i.e., rotated). The transmit element 210 and the coupling element 220 may be configured so that as the coupling element 220 is rotated by the rotor 215 there is no change in the inductive coupling between the transmit element 210 and the coupling element 220. The inductive coupling can generate a current in the coupling element 220. The coupling element 220 is inductively coupled to receive elements 240 as the coupling element is rotated so that at least a portion of the coupling element 220 overlaps the receive elements 240, where the amount of coupling is proportional to the portion of overlap between the elements. The coupling results in sinusoidal signals generated at the receive elements 240 of a sensor 230 as the coupling element is rotated.

As shown in FIG. 2, the receive elements 240 can include two channels that are spatially offset in order to generate a phase shift between their generated sinusoidal signals as the coupling element is rotated. The receive elements may include a first channel 231 (i.e., in-phase (I) channel) and a second channel (i.e., quadrature (Q) channel) that are configured to generate sinusoidal signals (i.e., components) that are 90 degrees out of phase from each other. For example, the first channel may generate a cosine component ($\cos(\theta)$) based on the angle of the coupling element 220 (i.e., the rotor 215), while the second channel 232 may generate sine component ($\sin(\theta)$) based on the angle of the coupling element 220. The sensor 230 may be configured to determine an angle ($\theta$) from the signals from each of the receive elements. For example, the sensor may be configured to apply an arctangent (or arc cotangent) to the cosine component and the sine component in order to calculate the angle ($\theta$) of the rotor 215.

The sensor may include other receive elements (not shown) that are arranged in the path of the coupling element 220 so that the output signal 250 from the sensor repeats in increments as the rotor 215 is rotated in one complete rotation. The first sensor 101 and the second sensor 102 of the vernier sensor 100 shown in FIG. 1 can be inductive sensors with different numbers of receive elements to produce the first frequency and the second frequency signals at their outputs.

Figure 3:
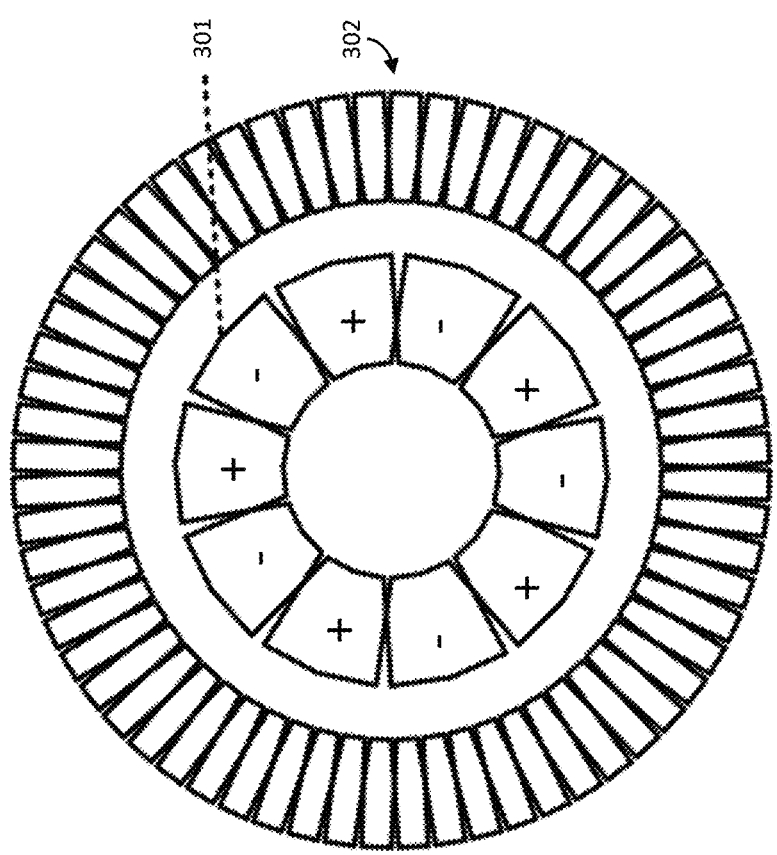
FIG. 3 illustrates a portion of vernier sensor according to an implementation of the present disclosure.

FIG. 3 illustrates a portion (e.g., receive elements) of vernier sensor according to an implementation of the present disclosure. Here, the sensors are implemented as two conductive traces forming a first sensor 301 (i.e., coarse position sensor) and a second sensor 302 (i.e., fine position sensor). Each sensor may include a plurality of conductive loops that corresponds to the number of increments in a full-scale measurement. The plurality of loops of the coarse position sensor are connected in series along a first circumference at first radius of the vernier sensor and the plurality of loops of the fine position sensor are connected in series along a second circumference at a second radius from a center of the vernier sensor. The first radius (i.e., first circumference) can be smaller than the second radius (i.e., second circumference). Accordingly, the fine position sensor may include more loops than the coarse position sensor.

Each conductive loop may include a positive portion and a negative portion based on its winding direction relative to the magnetic field. For example, as shown in FIG. 3, the first sensor includes five loops, each having a positive portion and negative portion. The positive portion and the negative portions are configured to produce a sinusoidal signal. The sinusoidal nature of the outputs can give rise to harmonic distortion, as will be discussed later.

Returning to FIG. 1, outputs for the first and second sensors can repeat as the movable element rotated from a starting position (i.e., 0 degrees) to a full-scale (FS) position (e.g., 360 degrees). As shown, the first output signal 111 has a frequency of four (i.e., has 4 increments (1, 2, 3, 4)), while the second output signal 121 has a frequency of five (i.e., has 5 increments (1, 2, 3, 4, 5,)). During each increment, the output signal from each sensor can vary from a minimum to a maximum value. The outputs may be normalized so that during an increment 112, the output of the first sensor 101 and the second sensor 102 can vary in value from 0 to 1 during each increment. The first output signal 111 and the second output signal 121 may provide an incremental measurement of the angle.

An absolute measurement of the angle can be obtained from each sensor if the increment for each measurement is known. For example, if the sensor is moved in one rotation (i.e., from 0 to FS) and an output signal is applied to a counter configured to offset the output signal for each increment (i.e., 1, 2, 3, . . . ), then an absolute signal may be generated. FIG. 1 illustrates a first absolute signal 113 based on the first output signal 111 and a second absolute signal 123 based on the second output signal 121. As the position moves, from 0 to full scale (FS), the absolute signal may progress from 0 to its maximum value multiplied by the number of increments. For example, when the first output signal 111 has a maximum value of 1 and has 4 increments (1, 2, 3, 4), then the first absolute signal 113 can vary from 0 to 4. Likewise, when the second output signal 121 has a maximum value of 1 and has five increments (i.e., 1, 2, 3, 4, 5), then the second absolute signal 123 can vary from 0 to 5. If an absolute signal is known, then, an absolute position may be determined using either sensor. Determining the absolute signal may require a full-scale rotation and therefore may not be suitable for typical measurements but can be used to calibrate the sensors, as will be described later.

The two sensors and their different frequencies (i.e., number of increments) can have a unique pair of outputs for measurements in a measurement range from 0 to full scale (e.g., 0≤θ≤360). The pairs of outputs may be plotted against one another to produce a graph (i.e., map) of outputs. Each point in the map of outputs may represent a position (e.g., angle) in the measurement range.

Figure 4:
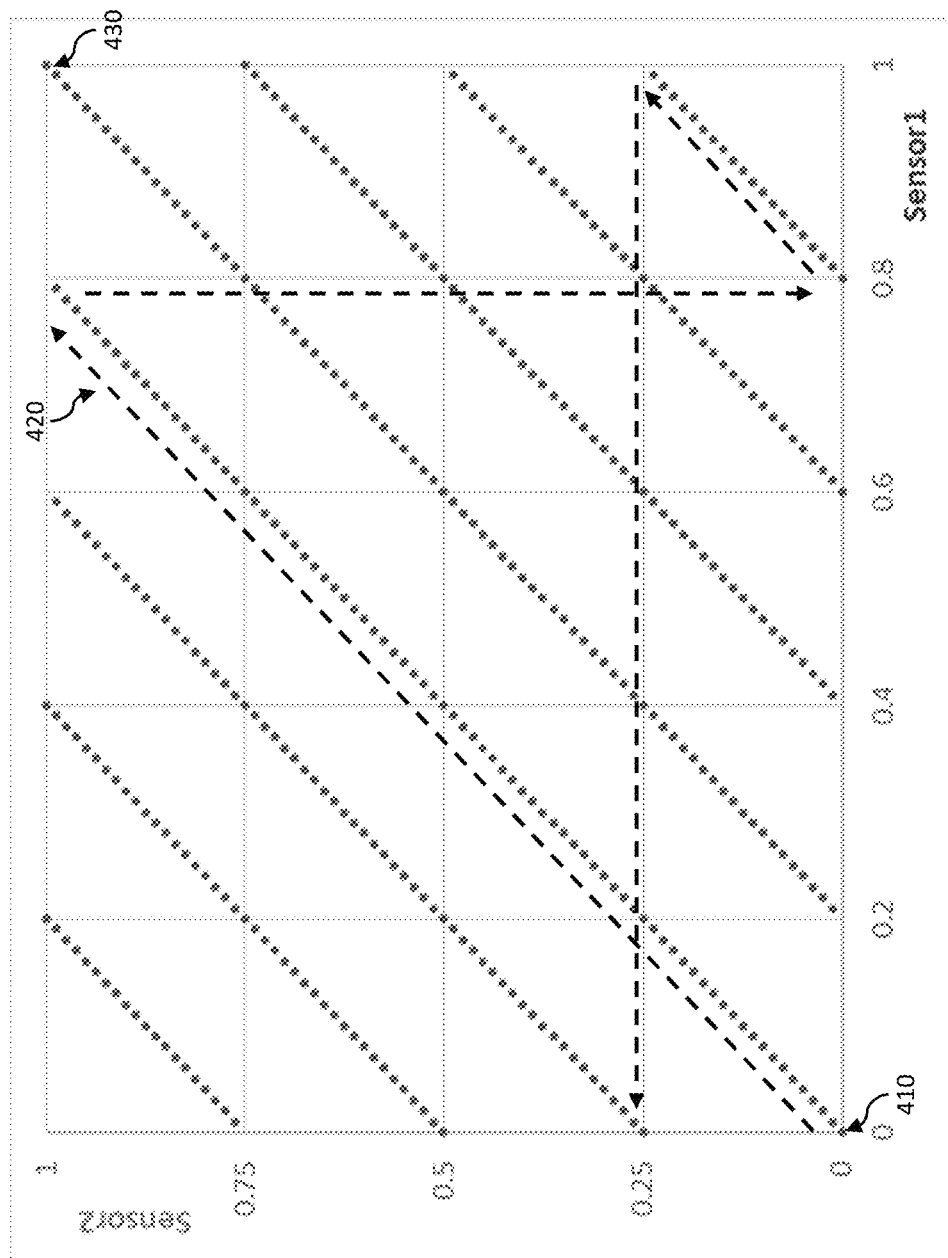
FIG. 4 illustrates an ideal map of sensor outputs according to an implementation of the present disclosure.

FIG. 4 illustrates a map of sensor outputs according to an implementation of the present disclosure. The plotted points are outputs of ideal sensors. In the map, the output of the first sensor (i.e., sensor1) determines an X-axis coordinate while the output of the second sensor (i.e., sensor2) determines a Y-axis for each pair of possible outputs. The first pair of outputs 410 may be (0,0). As the vernier sensor is rotated, the output of the sensors can follow a path 420, which is partially shown in the map (i.e., dotted lines). The path shows that when the second sensor reaches its maximum normalized output (i.e., 1), the first sensor output has not yet reached its maximum normalized output (i.e., is only 0.8). The path 420, which is partially shown in FIG. 4, may be traced through the map until the sensors reach their final pair of outputs 430 in the measurement range, which is both sensors at their maximum normalized output (i.e., (1,1)).

The graph (i.e., map) shown in FIG. 4 may be referred to as an ideal map because it includes the outputs that are not affected by noise or distortion. The ideal map may be used as a reference to which actual measurements may be compared to determine a position.

Figure 5:
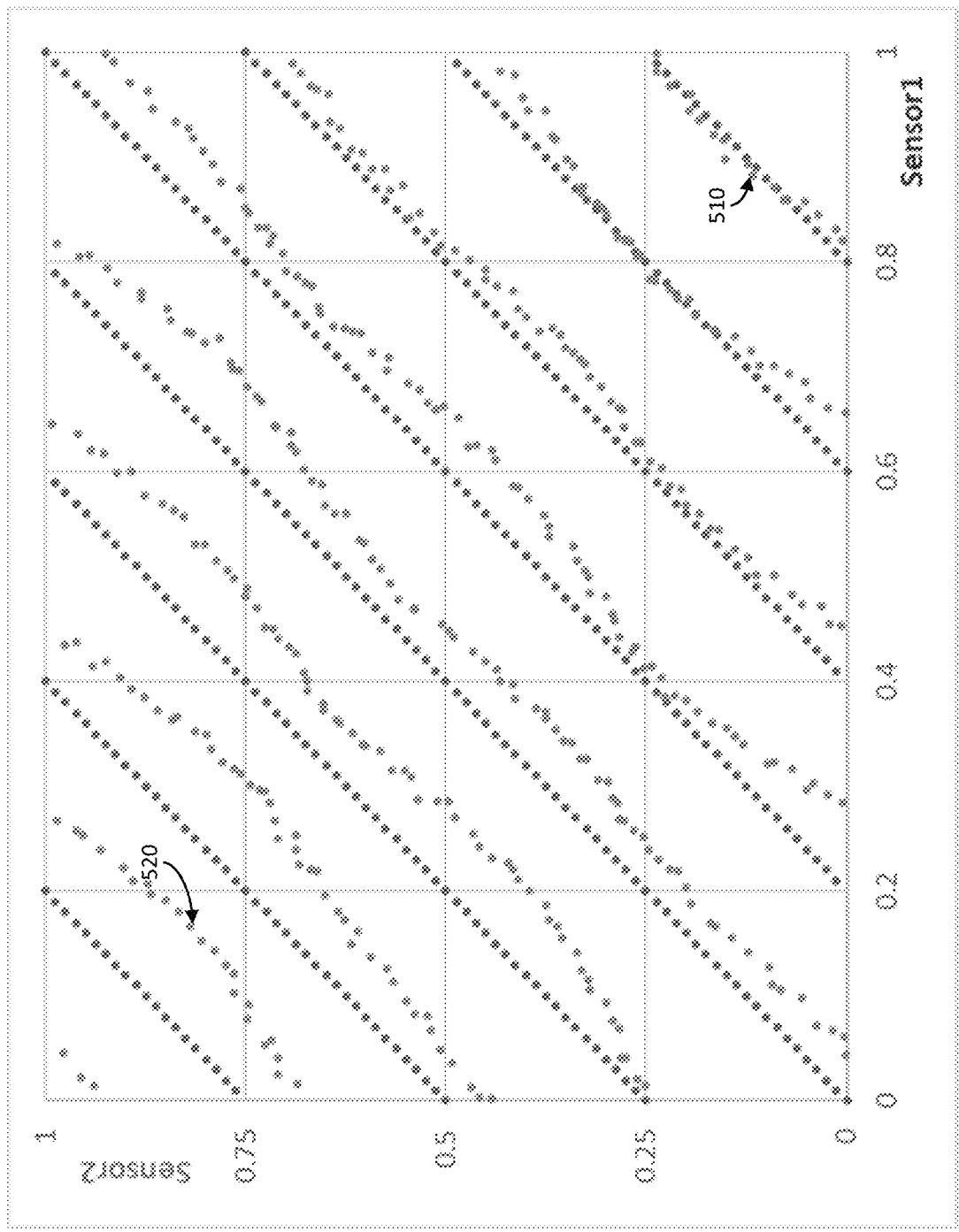
FIG. 5 illustrates a map of non-ideal sensor outputs overlaid on an ideal map of sensor outputs according to an implementation of the present disclosure.

FIG. 5 illustrates a map of non-ideal sensor outputs overlaid on an ideal map of sensor outputs according to an implementation of the present disclosure. As shown, noise and distortion cause deviations of the sensor outputs from the ideal map (i.e., errors). Small errors may not create a measurement error because a non-ideal sensor output can be recognized as its ideal counterpart by determining the closest mapped point in the ideal map. For example, a first non-ideal output 510 may be easily paired with a point in the ideal map. As noise and/or distortion in the measurement becomes larger, however, this determination can become more difficult (e.g., impossible). For example, a second non-ideal output 520 may be paired with almost equal certainty to two different points in the ideal map.

Calibration can be used to make non-ideal outputs closely match those of the ideal map. For example, while random errors caused by noise (e.g., thermal noise) may not be removed with calibration, systematic distortions, such as harmonic distortion, can be substantially removed (e.g., completely removed) through calibration. Further, if the sensor distortions and errors are independent, then calibrating one sensor to the other is possible. The systematic distortion may depend on the type of sensor implemented. As described previously, calibration can include transforming the (incremental) first output signal and the (incremental) second output signal into a first absolute signal and a second absolute signal.

Figure 6:
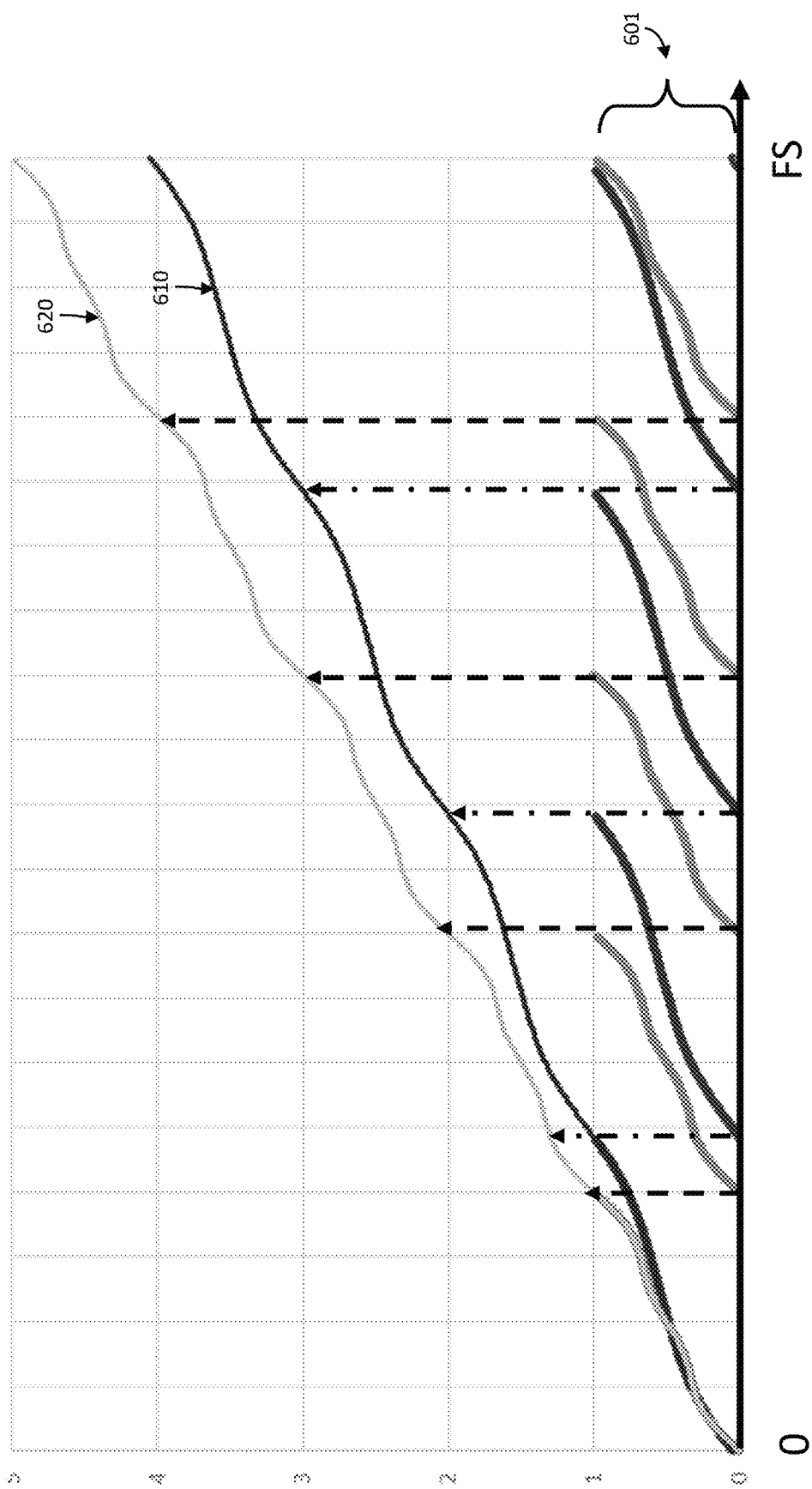
FIG. 6 is a graph illustrating transformations from incremental output signals to absolute output signals according to an implementation of the present disclosures.

FIG. 6 is a graph illustrating transformations from incremental output signals from a first sensor and a second sensor to absolute output signals (i.e., absolute signals) from the first sensor and the second sensor. As shown, the incremental output signals 601 can repeat as the movable element is moved through a full scale (FS) measurement. As in the example of FIG. 1, the first output signal can repeat 4 times (i.e., 4 increments), while the second output signal can repeat 5 times (i.e., 5 increments). The increments of the first output signal can be appended to compute a first absolute signal 610 and the increments of the second output signal can be appended to compute a second absolute signal 620. Put another way, each increment can be scaled by its increment so that the end of an increment is adjacent to the start of a next increment, as shown in the dotted lines of FIG. 6. The absolute measurements extend from a minimum level (i.e., zero) to a maximum level that depends on the number of increments.

The first absolute signal (i.e., $Out_1$) may be given by equation (1), shown below.

$$Out_1(\theta) = (N\theta + \Sigma c'_k e^{jkN\theta}) \bmod 2\pi \quad (1)$$

As expressed in equation (1), the first absolute signal ($Out_1$) includes an absolute measurement term (NO) that is linearly related to the angle (θ) of the movable element and scaled by a first frequency (N) of the first sensor (i.e., coarse position sensor). The first absolute signal ($Out_1$) further includes a harmonic distortion term that is a sum of sinusoids at multiples (k) (i.e., orders) of the first frequency (N), where each order has an amplitude ($c'_k$), that decreases as the order increases, and where "j" is the imaginary unit.

Likewise, the second absolute signal (i.e., $Out_2$) may be given by equation (2), shown below.

$$Out_2(\theta) = (M\theta + \Sigma c''_l e^{jlM\theta}) \bmod 2\pi \quad (2)$$

As expressed in equation (2), the second absolute signal ($Out_2$) includes an absolute measurement term (MO) that is linearly related to the angle (θ) of the movable element and scaled by a second frequency (M) of the second sensor (i.e., fine position sensor). The second absolute signal ($Out_2$) further includes a harmonic distortion term that is a sum of sinusoids at multiples (l) (i.e., orders) of the second frequency (M), wherein each order has an amplitude ($c''_l$), which decreases as the order increases.

The absolute signals can be scaled relative to each other so that they can be compared. Scaling can be applied so that both absolute measurements extend from the minimum level to the same maximum level. In other words, the first output signal may be scaled relative to the second output signal to generate a first scaled signal. Likewise, the second absolute signal may be scaled relative to the first absolute signal to generate a second scaled signal. The maximum value of the scaled signals can be the maximum value of the first absolute signal multiplied by the maximum value of the second absolute signal. Ideally the scaled absolute measurements overlay perfectly, and their difference is zero. However, errors due to noise and distortion can lead to differences. The disclosed calibration process can reduce these differences.

To scale, the first absolute signal ($Out_1$) can be multiplied by the second frequency (i.e., M) of the second sensor, while the second absolute signal ($Out_2$) can be multiplied by the first frequency (i.e., N) of the first sensor. The scaled signals can be subtracted to determine their difference. What results after subtraction is a difference signal that includes only the harmonic distortion terms. The difference signal is represented below in equation (3).

$$MOut_1(\theta) - NOut_2(\theta) = M\Sigma c'_k e^{jkN\theta} - N\Sigma c''_l e^{jlM\theta} \quad (3)$$

The difference signal is a sum of harmonics at multiples of the first sensor frequency (i.e., N) and at multiples of the second frequency (i.e., M). Each harmonic can have an amplitude given by the coefficients (i.e., $c'_k$, $c''_l$). Calibration can include determining coefficients that minimize the effects of these harmonics.

Figure 7:
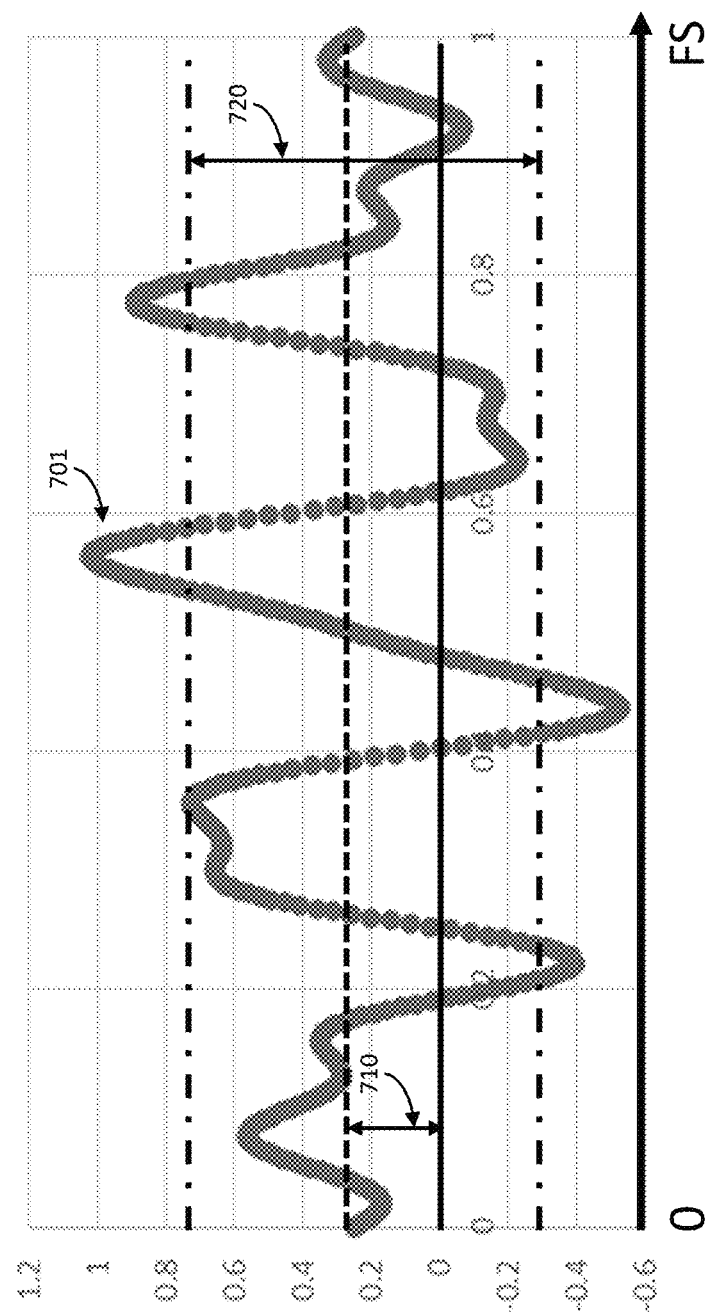
FIG. 7 illustrates a difference signal according to an implementation of the present disclosure.

FIG. 7 illustrates a difference signal according to an implementation of the present disclosure. In particular, the difference signal 701 shown corresponds to the difference between the first absolute signal 610 and second absolute signal 620 shown in FIG. 6 (after scaling). The difference signal 701 amplitude is plotted for a measurement range (e.g., 0 to FS). Ideally the difference signal is equal to zero, but harmonic distortion can create variations. The variations may be characterized by an offset 710 and a variability 720 of the points in the difference signal 701. In a possible implementation, the offset 710 may be defined as an average of the difference signal 701, while the variability 720 may be defined as the variance of the difference signal. The disclosed calibration method may include determining a first calibration for the first sensor and a second calibration for the second sensor that minimize the offset 710 and the variability 720 of the difference signal. The first calibration may include one or more first calibration coefficients and the second calibration may include one or more second calibration coefficients. The first calibration (e.g., first calibration coefficients) may be applied to the first output signal and the second calibration (e.g., second calibration coefficients) may be applied to the second output signal to reduce (e.g., eliminate) the offset (e.g., average) and the variability (e.g., variance) of the difference signal.

The offset may result from an angular offset between the two sensors. The offset may be computed as the expected value (i.e., average) of the difference signal, as shown in equation (4) below.

$$E[MOut_1(\theta_i) - NOut_2(\theta_i)] = Mc'_0 - Nc''_0 \quad (4)$$

In other words, the offset may include the zeroth order harmonic distortion. Calibration may include determining a calibration (e.g., a calibration coefficient) to minimize the offset (e.g., make zero). For example, the calibration coefficient may be added to the output of one sensor to compensate for their average difference. After minimizing the offset, the variance of the difference signal can be computed, as shown in equation (5) below.

$$E[\text{Var}(MOut_1(\theta_i) - NOut_2(\theta_i))] = M^2 \Sigma_{kN \ne lM} |c'_k|^2 + N^2 \Sigma_{kN \ne lM} |c''_l|^2 + \Sigma_{kN=lM} |Mc'_k - Nc''_l|^2 \quad (5)$$

As shown in equation (5), the harmonic distortion may include orders (i.e., k=0, 1, 2, 3, . . . ) of the first frequency (i.e., kN) and orders (i.e., l=0, 1, 2, 3, . . . ) of the second frequency (i.e., lM). The amplitude (i.e., coefficient) of each order may decrease as the order increases. For example, a $10^{th}$ order coefficient may be smaller than a $1^{st}$ order coefficient.

Determining a calibration (e.g., calibration coefficients) to reduce the variance may be carried for the first output and the second output independently for orders that are not common (i.e., kN≠lM) to both outputs. However, calibration may not be possible for orders that are common (i.e., kN=lM) because the calibration process for each output may not be independent. The vernier sensor of the present disclosure describes a calibration method that accounts for the common orders through an approximation that corresponds to relationships between the first frequency and the second frequency that are based on the physical designs of the first sensor (i.e., coarse sensor) and the second sensor (i.e., fine sensor).

Frequencies (N, M) of the first and second sensors may be selected so that orders common to both outputs (i.e., kN=lM) result in terms of the variance (equation (5)) that are small and can therefore be eliminated. This can be accomplished in two ways. First, the second frequency (M) may be made much higher (e.g., more than 10 times) than the first frequency (N). For example, if the first frequency (N) is 5 then the second frequency (M) can be 64. Second, the first frequency (N) and the second frequency (M) may be made coprime so that the first order that is common to both is their product (N·M). For example, the first common component in the harmonic distortion for N=5 and M=64 is the 320 harmonic. In his case, the third term of the variance question can be approximated as shown below in equation (6).

$$|64c'_{64} - 5c''_5|^2 \approx |5c''_5|^2 \quad (6)$$

As a result, the independence can be maintained because the $64^{th}$ order harmonic first absolute signal (i.e., $c'_{64}$) is insignificant compared to the $5^{th}$ order harmonic of the second absolute signal (i.e., $c''_5$). For example, the $64^{th}$ harmonic may be more than 100 times smaller than the 5 harmonics. Independent terms in the difference signal allow optimization of the coefficients for the first sensor without affecting the calibration coefficients for the second sensor, and vice versa. Further, the calibration process may limit itself to the most significant orders (e.g., 0≤orders≤5) of the harmonic distortion to increase speed and reduce complexity of the variance calculation.

The disclosed calibration technique, which is based on the offset and the variance, can be much less computationally complex than other calibration techniques. For example, calibration using a Fourier transform to determine harmonic content can require more computational steps, more measurement points, and require more careful control of how a calibration measurement is made. The use of coprime frequencies can help to determine positions unambiguously and can help simplify the calibration the sensor using variance.

The disclosed calibration technique can also be more versatile in the measurements it uses to calibrate than other calibration techniques. For example, it may not be necessary to collect a full measurement range in order to acquire a difference signal suitable for calibration. This may be especially useful for calibrating a device (e.g., robotic arm) without changing its normal operating movement. For example, a difference signal may be acquired in the field as the device is operated. The offset (e.g., average) and/or variability (e.g., variance) of the difference signal may be analyzed routinely to determine how well the calibration is performing. If the offset and/or variability satisfy a criterion (e.g., exceed a threshold), then the device may be out of calibration. In this condition, another calibration process (i.e., a recalibration process) may be triggered or another action may be triggered, such as generating an alert that the device requires calibration.

The disclosed calibration technique can also be more immune to measurement variations than other calibration techniques. For example, the calibration does not require the measurement points in the difference signal (see FIG. 7) to be equally spaced, as is required in more complex methods that utilize a Fourier transform. This freedom can simplify the operation of gathering calibration data because the movement does not have to be carefully controlled to be the same speed throughout the measurement range. Further, because the calibration is based on a comparison between the first sensor and the second sensor, no accurate reference must be used as a basis of comparison.

Figure 8:
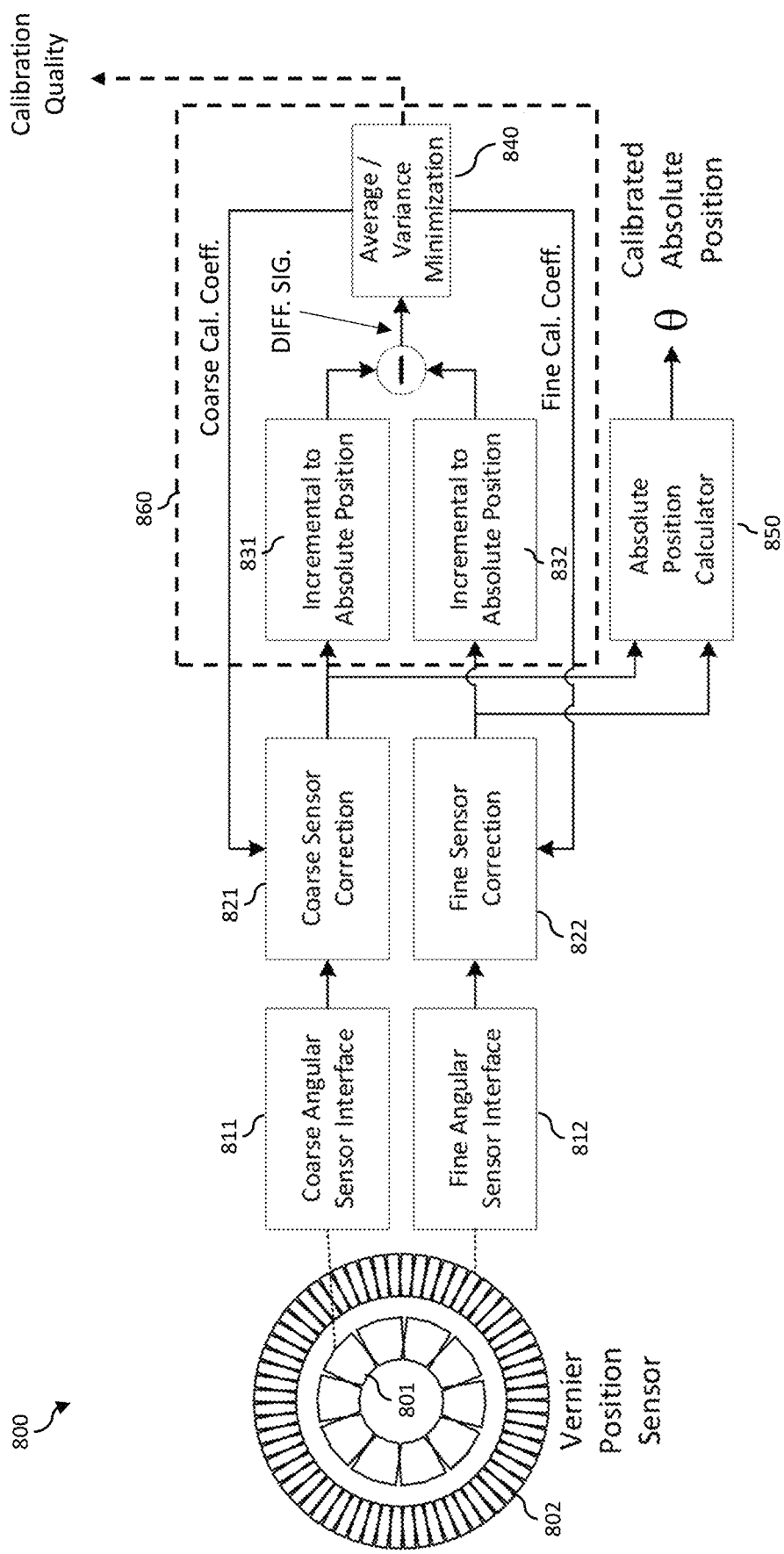
FIG. 8 illustrates a block diagram of a position measurement system according to a possible implication of the present disclosure.

FIG. 8 illustrates a block diagram of a calibration system for a vernier sensor according to a possible implication of the present disclosure. The system 800 includes a vernier sensor including a coarse position sensor 801 (i.e., first position sensor) and a fine position sensor 802 (i.e., second position sensor). The coarse position sensor 801 may have a first frequency that is lower than the second frequency of the fine position sensor. For example, the second frequency may be more than 10 times the first frequency and the frequencies may be coprime so that the harmonics shared by both sensors are negligible (e.g., <0.1% of the first harmonic of either sensor).

The system 800 further includes a coarse angular sensor interface 811 configured to couple signals from the coarse position sensor 801. The signals output from the coarse angular sensor interface may be sinusoidal signals as described for the inductive sensor shown in FIG. 2. Likewise, the system 800 further includes a fine angular sensor interface 812 configured to couple signals from the fine position sensor 802.

The system 800 further includes a coarse sensor correction circuit 821 (i.e., module, block) configured to apply coarse calibration coefficients to the sinusoidal signals output from the coarse angular sensor interface 811. Accordingly, the coarse sensor correction block may be configured to store a set of calibration coefficients (i.e., first calibration coefficients) for the coarse sensor. The system 800 further includes a fine sensor correction circuit 822 (i.e., module, block) configured to apply fine calibration coefficients to the sinusoidal signals output from the fine angular sensor interface 812. Accordingly, the fine sensor correction circuit 822 may be configured to store a set of calibration coefficients (i.e., second calibration coefficients) for the fine sensor.

The system 800 further includes an absolute position calculator 850. The absolute position calculator is configured to receive the coarse signals and the fine signals and to produce an angle based on the results. For example, the absolute position calculator may be configured to convert an in-phase channel and a quadrature channel from the coarse sensor into a coarse incremental measurement, as described for FIG. 2. Likewise, the absolute position calculator may be further configured to convert an in-phase channel and a quadrature channel from the fine sensor into a fine incremental measurement, as described for FIG. 2. The absolute position calculator may be further configured to determine an absolute portion (e.g., angle (θ)) based on where the coarse incremental measurement and the fine incremental measurement based are located in a map of measurements, such as shown in FIG. 4.

The system includes a calibration block 860 (i.e., calibration module, calibration program, calibration software) that is configured to generate/update the calibration coefficients used to obtain the calibrated absolute position. The calibration may be performed periodically and can be executed automatically (e.g., triggered based on the results of a calibration check) or manually (e.g., executed by a user). When calibration/checking is not necessary the calibration block 860 of the system may be disabled. In some implementations however the calibration block may be enabled during normal operation to monitor a calibration quality of the calibration coefficients. For example, the average and/or variance of a difference signal may be monitored. When the average and/or variance of the difference signal satisfies a criterion (e.g., exceeds a threshold) the calibration block may generate a calibration quality signal to trigger an action, such as an automatic recalibration or a warning message that the vernier sensor is not calibration.

The calibration block 860 includes a first incremental to absolute position module 831 for the coarse signal and a second incremental to absolute position module 832 for the fine signal. The modules are configured to convert the incremental measurements into absolute measurements, as shown FIG. 6. The calibration block is further configured to compute a difference signal, such as shown in FIG. 7, from the (scaled) absolute measurements. The calibration block 860 further includes an offset/variability (e.g., average/variance) minimization module 840 (i.e., calibration determination module). This module can be any optimization routine that varies coefficients while monitoring the offset (e.g., average) and variability (e.g., variance) of the difference signal as a cost function.

Figure 9:
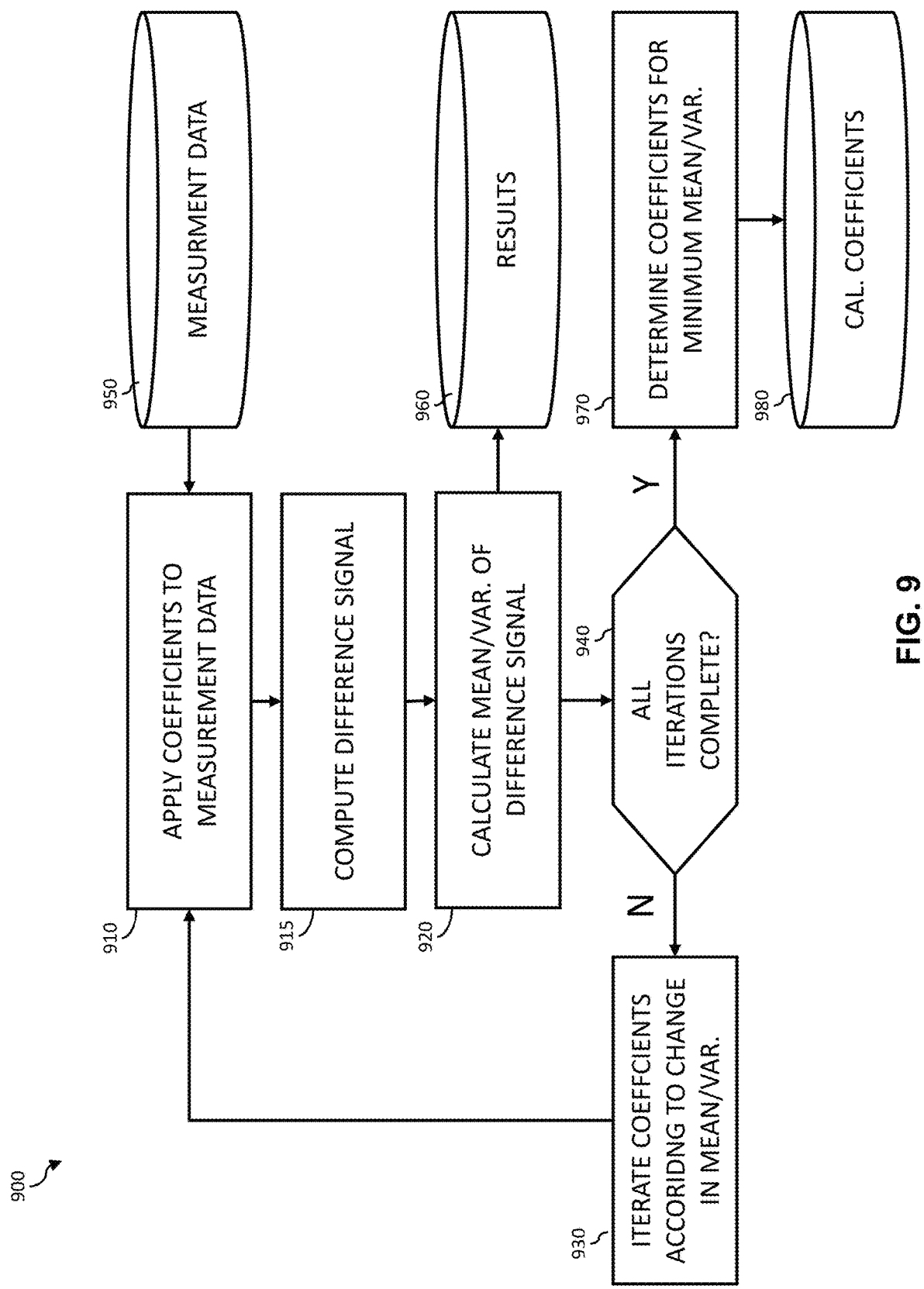
FIG. 9 is a flowchart of a method for determining calibration coefficients for a vernier position sensor according to a possible implementation of the present disclosure.

FIG. 9 is a flowchart of a method to determine calibration coefficients for a vernier position sensor according to a possible implementation of the present disclosure. The method is based on minimizing the average and the variance of the difference signal. The method 900 includes acquiring measurement data 950. The measurement data 950 can be recalled from memory so that the same measurement data 950 may be used for multiple iterations of the method. The measurement data can be stored in memory as a result of a movement of the position sensor over a range, where the range can be any range up to, and including, the entire measurement range of the position sensor. In other words, the range of movement for calibration does not necessarily have to be the entire measurement range of the position sensor so long as the difference signal may be computed from the measurement.

The method 900 further includes applying 910 coefficients to the measurement data to generate corrected measurement data. The method further includes computing 915 a difference signal from the corrected measurement data and calculating a mean and/or a variance of the difference signal 920. The results 960 of this calculation can be stored for comparison with subsequent calculations. The method further includes determining 940 if all iterations are complete. If not, the method iterates 930 the coefficients and repeats the process to determine results from corrected measurement data using the iterated coefficients. The iteration (i.e., change) to the coefficients may be based on a change in the mean and variance from a previous iteration. For example, if the mean and variance are increased the coefficients may be iterated in a way that opposes this change, while if the mean and variance are decreased, the coefficients may be iterated in a way that supports this change. When all iterations are complete, the method then determines 970 a result from all of the stored results 960 that has the minimum (i.e., lowest) mean and/or variance. The coefficients associated with this result are then stored as the calibration coefficients 980. For example, the coefficients resulting from this process may replace previously recorded coefficients. Alternatively, resulting from this process may be used to update (i.e., change) some previously recorded coefficients.

Figure 10:
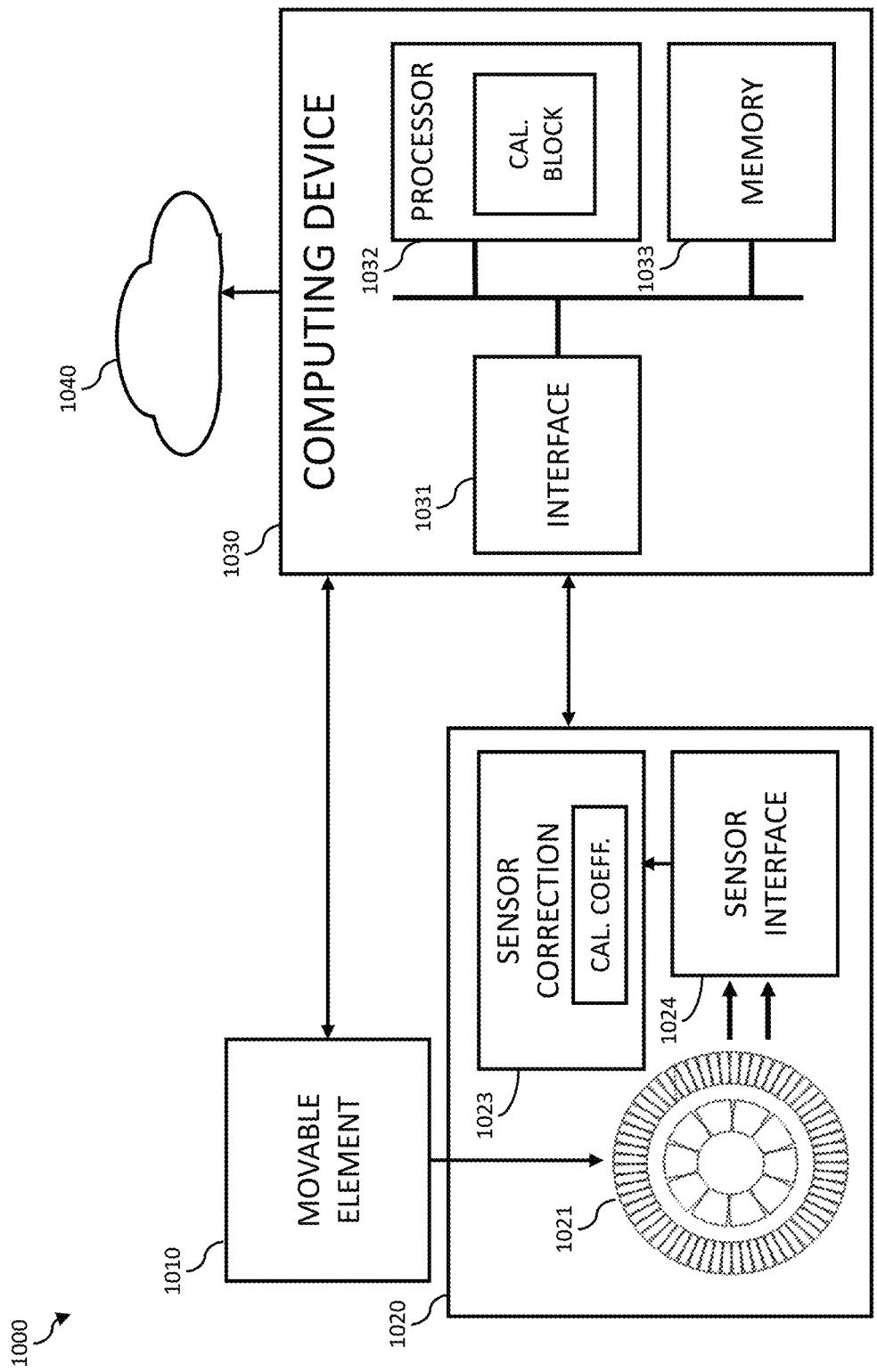
FIG. 10 is a calibrated measurement system according to an implementation of the present disclosure.

FIG. 10 is a calibrated measurement system according to an implementation of the present disclosure. The system 1000 includes a movable element that is mechanically coupled to a position sensor 1020 configured to monitor its movement. For example, the movable element 1010 may be a robotic arm, a steering wheel, or an automatic door. The movements of the movable element correspond to movements of the position sensor 1020 that can be converted into electrical signals by a vernier sensor 1021. The vernier sensor 1021 is coupled to a sensor interface 1024 that can output signals related to the coarse sensor and fine sensor of the vernier sensor 1021 to a sensor correction circuit. The sensor correction circuit 1023 is configured to store calibration coefficients that can then be mathematically applied (e.g., addition, subtraction, multiplication, division, etc.) to the signals to minimize noise and distortion.

The position sensor 1020 may be communicatively coupled to a computing device 1030 via an interface 1031 (e.g., wireless interface). In a possible implementation, the computing device may be configured to communicate instructions to, and receive data from, the position sensor 1020 and the movable element 1010.

The computing device 1030 can include a memory 1033, such as a non-transitory computer readable memory that can store software instructions to configure a processor 1032 to perform any or all of the processing disclosed herein. In a possible implementation, the processor may configure the movable element 1010 and the position sensor 1020 in a calibration mode. In the calibration mode, the processor may be further configured to perform the functions of the calibration block 860, as shown in FIG. 8. The processor may be further configured (e.g., by software instructions) to determine the absolute position of the position sensor 1020 from the corrected signals received at the interface 1031. Any, or all, of the functions described for the processor could be implemented in hardware, as well. For example, an ASIC or a FPGA could be designed or programmed (e.g., using software instructions) to perform any, or all, of the processes described herein. Alternatively, in a hybrid software/hardware implementation, the calibrated measurement system could include a computing device (i.e., processor) to perform some operations and hardware (e.g., ASIC, FPGA) to perform other operations.

The computing device 1030 may be coupled to a network 1040 (i.e., cloud) and some, or all, of the processing described herein may be performed by a remote computing device (or devices) coupled to the computing device 1030 through the network 1040. In a possible implementation the computing device may report a status regarding a calibration to the network. For example, the processor may be configured to monitor a quality of the calibration and if the calibration quality changes, the computing device may transmit a message to the network that the position sensor 1020 requires calibration.

Figure 11:
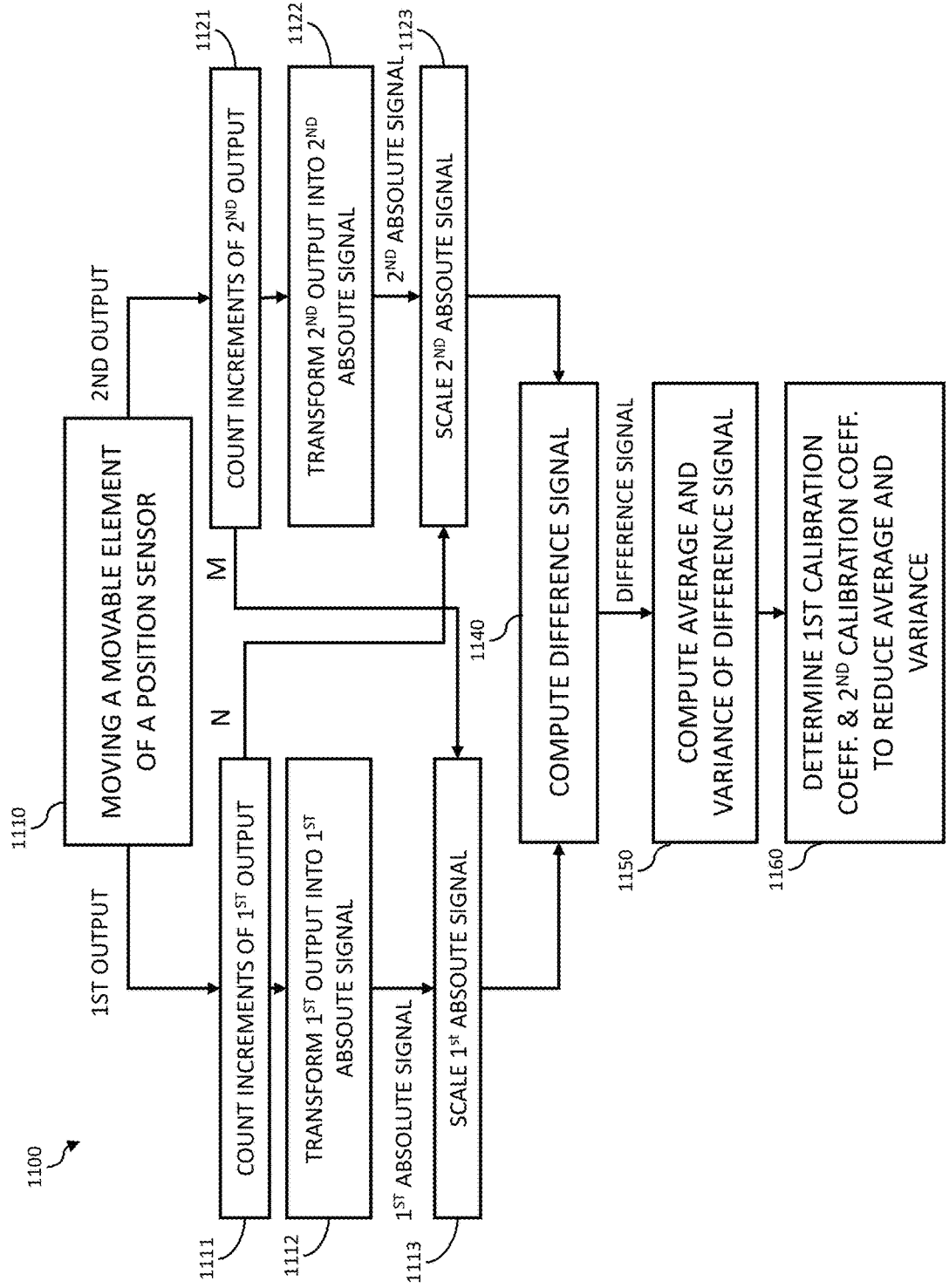
FIG. 11 is a flowchart of a method for determining calibration coefficients for a position sensor according to an implementation of the present disclosure.

FIG. 11 is a flowchart of a method for determining calibration coefficients for a position sensor according to an implementation of the present disclosure. The method 1100 includes moving 1110 a movable element (e.g., rotor) of a position sensor. The movement of the element may be all of the measurement range of the position sensor or may be a portion (e.g., <90%) of the measurement range of the position sensor, and the portion may be in any position within the measurement range of the position sensor. For example, if the portion is one-half (i.e., 50%) of the measurement range (i.e., 0 to 100%), the portion may include measurements in the 25-75% portion of the measurement range or measurements in the 50-100% of the measurement range. The portion does not need to include the maximum or minimum of the measurement range. The movement can be at different speeds through the measurement range. When the movement includes a range of speeds, measurement points in the first output and the second output of the first sensor and second sensor are not equally spaced.

The method 1100 further includes obtaining a first output signal ($1^{st}$ output) from the first sensor of the vernier sensor and a second output ($2^{nd}$ output) from the second sensor of the vernier sensor. Based on the movement, the first output and the second output will repeat in increments. The method 1100 further includes counting 1111 the increments of the first output (i.e., N) and counting 1121 the increments of the second output (i.e., M). The counting may include tagging or scaling each increment of the output signal according to its increment.

The method 1100 further includes transforming 1112 the first output signal into a first absolute signal. The transforming includes appending the (scaled) increments of the first output in sequence according to their increment. The method 1100 further includes transforming 1122 the second output signal into a second absolute signal. The transforming 1122 includes appending the (scaled) increments of the first output in sequence according to their increment. The first absolute signal can increase from 0 to the number of increments in the first output (i.e., N) and the second absolute signal can increase from 0 to the number increments in the second output (i.e., M).

The method 1100 further includes scaling 1113 the first absolute signal according to the second absolute signal. For example, the first absolute signal may be multiplied by M so that its maximum value is N times M. The method 1100 further includes scaling 1123 the second absolute signal according to the first absolute signal. For example, the second absolute signal may be multiplied by N so that its maximum value is M times N.

The method 1110 further includes computing 1140 a difference signal as the point-by-point difference of the scaled absolute signals and computing 1150 an average and a variance of the difference signal.

The method 1110 further includes determining 1160 a first set of calibration coefficients corresponding for the first output and a second set of calibration coefficients for the second output that reduce the computed average and variance. The determination may use any optimization method (i.e., process, routine), such as the one shown in FIG. 9.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A method for calibrating a position sensor, the method comprising:
  moving a movable element of the position sensor over a measurement range to acquire:
    a first output signal from a first sensor, the first output signal having increments repeating at a first frequency, and
    a second output signal from a second sensor, the second output signal having increments repeating at a second frequency;
  computing a difference signal based on the first output signal and the second output signal;
  calculating an offset of the difference signal;
  calculating a value of a variance of the difference signal;
  determining a first calibration and a second calibration to reduce the offset and the value of the variance of the difference signal; and
  applying the first calibration to the first output signal and the second calibration to the second output signal.

2. The method according to claim 1, further comprising:
  repeating the computing, the calculating, the determining, and the applying for a number of iterations to determine the offset and the value of the variance of the difference signal for each iteration;
  comparing the offset and the value of the variance of repetitions of the number of iterations to select an iteration that generated a minimum offset and a minimum variability; and
  storing, in a memory, the first calibration and the second calibration of the selected iteration.

3. The method according to claim 2, wherein the first calibration includes a plurality of first calibration coefficients and the second calibration includes a plurality of second calibration coefficients.

4. The method according to claim 1, wherein the measurement range is a portion of a total measurement range of the position sensor.

5. The method according to claim 4, wherein the portion is less than less than 90% of the total measurement range.

6. The method according to claim 4, wherein the portion does not include a maximum of the total measurement range or a minimum of the total measurement range.

7. The method according to claim 1, wherein the first output signal and the second output signal include measurements taken at positions in the measurement range that are not equally spaced.

8. The method according to claim 1, wherein the position sensor is an angular position sensor.

9. The method according to claim 8, wherein the first sensor and the second sensor are inductive sensors.

10. The method according to claim 1, wherein calculating the value of the variance of the difference signal includes approximating an expected value of the variance of the difference signal based on (i) a frequency of the second sensor being larger than the first sensor and (ii) a frequency of the second sensor being coprime with the frequency of first sensor.

11. The method according to claim 10, wherein the frequency of the second sensor is greater than or equal to 10 times the frequency of the first sensor.

12. The method according to claim 10, wherein the approximating includes eliminating harmonic components in the expected value of the variance of the difference signal that are common to the first sensor and the second sensor.

13. The method according to claim 1, wherein computing a difference signal based on the first output signal and the second output signal includes:
  appending the increments of the first output signal to generate a first absolute signal;
  appending the increments of the second output signal to generate a second absolute signal;
  scaling the first absolute signal relative to the second absolute signal to generate a first scaled absolute signal;
  scaling the second absolute signal relative to the first absolute signal to generate a second scaled absolute signal; and
  subtracting, point by point, the first scaled absolute signal from the second scaled absolute signal to compute the difference signal.

14. The method according to claim 1, wherein the value is an expected value.

15. A position measurement system including:
  a position sensor including:
    a first sensor configured to output a first output signal;
    a first sensor correction circuit configured to apply a first calibration to the first output signal to generate a first corrected signal;
    a second sensor configured to output a second output signal; and
    a second sensor correction circuit configured to apply a second calibration to the second output signal to generate a second corrected signal; and
  a processor coupled to the position sensor and configured by software instructions to:
    generate a difference signal based on the first corrected signal and the second corrected signal;
    calculate an offset of the difference signal;
    calculate a value of a variance of the difference signal; and determine a calibration quality based on a first comparison of the offset to a first threshold and a second comparison of the value of the variance to a second threshold.

16. The position measurement system according to claim 15, wherein the processor is further configured by software instructions to:
calculate an angle based on the first corrected signal and the second corrected signal.

17. The position measurement system according to claim 16, wherein to calculate the angle the processor is further configured by software instructions to:
map the first corrected signal and the second corrected signal to a closest point on an ideal map of outputs, wherein each point on the ideal map of output corresponds to an angle.

18. The position measurement system according to claim 15, wherein the processor is further configured by software instructions to:
generate a message when the offset drops below the first threshold or the value of the variance drops below the second threshold.

19. The position measurement system according to claim 15, wherein the processor is further configured by software instructions to:
recalibrate the position sensor by:
iteratively computing the offset and the value of the variance of the difference signal for different calibrations coefficients to find a new first calibration for the first output signal and a new second calibration for the second output signal.

20. The position measurement system according to claim 15, wherein:
the position sensor is an inductive angular sensor having a first number of repeating increments in a 360-degree measurement range; and
the position sensor is an inductive angular sensor having a second number of repeating increments in the 360-degree measurement range, wherein the first number and the second number are coprime.

21. The position measurement system according to claim 15, wherein:
the first output signal includes a first frequency and harmonics of the first frequency;
the second output signal includes a second frequency and harmonics of the second frequency; and
the second frequency is higher than the first frequency and the second frequency and the first frequency are coprime so that the value of the variance of the difference signal can be approximated to eliminate harmonics common to both the first frequency and the second frequency.

22. A method for determining calibration coefficients for a vernier position sensor, the method comprising:
transforming a first incremental signal from a first sensor of the vernier position sensor to a first absolute signal;
transforming a second incremental signal from a second sensor of the vernier position sensor to a second absolute signal;
computing a difference signal of based on the first absolute signal and the second absolute signal;
calculating an offset and a variability of the difference signal, the variability being a value of a variance of the difference signal; and
performing an optimization routine that includes adjusting calibration coefficients applied to the first incremental signal and the second incremental signal to reduce the offset and the variability of the difference signal.

23. The method for determining calibration coefficients for a vernier position sensor according to claim 22, wherein the optimization routine includes:
gathering a calibration measurement using the vernier position sensor to obtain a first incremental signal for calibration and a second incremental signal for calibration; and
iteratively:
selecting calibration coefficients,
applying the selected calibration coefficients to the first incremental signal and the second incremental signal, and
calculating the offset and the variability of the difference signal for each iteration to determine calibration coefficients that result in a minimum offset and variability for the iterations.

\* \* \* \* \*